(12) United States Patent
Buhr et al.

(10) Patent No.: US 6,802,027 B2
(45) Date of Patent: Oct. 5, 2004

(54) CIRCUIT ARRANGEMENT AND METHOD OF DETECTING ACCESS VIOLATION IN A MICROCONTROLLER

(75) Inventors: Wolfgang Buhr, Hamburg (DE); Detlef Mueller, Barsbuettel (DE); Dieter Hagedorn, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 137 days.

(21) Appl. No.: 10/078,938

(22) Filed: Feb. 19, 2002

(65) Prior Publication Data

US 2002/0184522 A1 Dec. 5, 2002

(30) Foreign Application Priority Data

Feb. 21, 2001 (DE) .......................... 101 08 107

(51) Int. Cl.$^7$ ................................ G06F 13/18
(52) U.S. Cl. .......................... 714/35; 710/54
(58) Field of Search .................. 710/52, 54, 240; 711/162, 163, 111; 712/226, 227; 713/200, 202; 714/763, 5, 9, 35

(56) References Cited

U.S. PATENT DOCUMENTS 5,619,408 A * 4/1997 Black et al. ............... 712/226
5,903,749 A * 5/1999 Kenner et al. ............. 712/226
6,035,380 A * 3/2000 Shelton et al. ............. 711/163
6,550,005 B1 * 4/2003 Hill ........................... 712/245

* cited by examiner

Primary Examiner—B. James Peikari
Assistant Examiner—Saumil R. Shah
(74) Attorney, Agent, or Firm—Kevin Simons

(57) ABSTRACT

To provide an electric or electronic circuit arrangement as well as a method of detecting and/or identifying and/or recording at least an access violation, particularly at least a memory access violation, in a microcontroller provided particularly for a chip card or smart card, with which the source causing this access violation (referred to as break source) as well as the code address occurring upon this violation can be detected and/or identified and/or recorded when an access violation occurs during the program run, the circuit arrangement comprises at least a memory unit; at least an interface unit assigned to the memory unit; at least a processor unit connected to the memory unit particularly via the interface unit for executing instruction codes. These instruction codes can be requested from the interface unit by means of at least a request unit; are run up in at least a fetch or request queue in the request unit; and are decodable by means of at least a decoding unit assigned to the processor unit for running the fetch or request queue, in which a given category of access violation codes is assignable to each given category of access violations. The access violation code replaces the corresponding instruction code, and comprises data such as information on the address, particularly the code address and/or the type and/or the location and/or the source and/or the instant of the access violation.

17 Claims, 1 Drawing Sheet

CIRCUIT ARRANGEMENT AND METHOD OF DETECTING ACCESS VIOLATION IN A MICROCONTROLLER

BACKGROUND OF THE INVENTION

1. Field of the Invention

The invention relates to an electric or electronic circuit arrangement and to a method of detecting and/or identifying and/or recording at least an access violation, particularly at least a memory access violation, in a microcontroller provided particularly for a chip card or smart card.

2. Description of Related Art

Such a direct detection and/or identification and/or recording of access violations, particularly memory access violations, is conventionally only possible in the case of violations occurring upon data memory access, because these violations have a directly temporal relation between the run-down of instructions and the access to the data memory unit or the EEPROM (=Electrically Erasable Programmable Read-Only Memory).

In contrast, there is generally no fixed temporal relation between the instant of collecting or requesting the instruction code and the instant of executing the instruction code in microcontrollers and particularly in microcontrollers provided for chip cards or smart cars (for example, in the form of SXA, i.e. "smart extended architecture"). In principle, these two processes run independently of each other and are only very loosely interrelated by the fetch or request queue mechanism.

Access violations, particularly memory access violations are now conventionally detected by triggering a general break exception process. As already stated hereinbefore, the memory source causing the access violation as well as the associated code address of the instruction causing the access violation cannot be detected in microcontrollers and particularly in microcontrollers provided for chip cards or smart cards.

This impossibility of diagnosing or tracing the cause(s) of a general break exception has the result that, in the case of a memory access violation, the operating system of the circuit arrangement could hitherto not detect which memory unit triggered the violation and which instruction had exactly led to the violation. Also the circuit arrangements and methods known from the documents DE 37 36 190 A1, U.S. Pat. Nos. 5,155,829, 5,491,827 and 5,920,690 cannot eliminate these problems.

BRIEF SUMMARY OF THE INVENTION

Starting from the conventional arrangements, the present invention has for its object to provide an electric or electronic circuit arrangement and a method of the type described in the opening paragraph with which, in the case of occurrence of an access violation dug the program run, the source causing this access violation (referred to as break source) as well as the code address at which the violation occurs can be detected and/or identified and/or recorded.

This object is solved by the characteristic features defined in claim 1 for an electric or electronic circuit arrangement and by the characteristic features defined in claim 9 for a corresponding method. Advantageous embodiments and further embodiments of the present invention are defined in the dependent claims.

The teaching of the present invention is based on specially defined and/or specially encoded access violation codes which indicate an access violation and, likewise as the conventional instruction codes, are passed or moved through the fetch or request queue before these access violation codes become effective, for example, in the form of an "exception" and/or a "flag" during execution by means of the processor unit.

Requesting the instruction code or the access violation code and executing the instruction code or the access violation code substantially proceed temporally independently of each other in this case, i.e. "code memory fetch timing" and "instruction execution timing" are temporally independent of each other.

Such an access violation, which usually occurs when instruction codes are fetched or requested, is only effective in accordance with an advantageous embodiment of the present invention when the codes are actually executed after running through the fetch or request queue. In other words, this means that a violation does not occur when the fetch or request queue is erased before the code leading to a violation is executed.

With reference to the present invention, those skilled in the field of electric or electronic circuit techniques will appreciate the fact that the code access violation is detected exactly at the instant of executing the instruction code or the access violation code by the processor unit, i.e. it is not detected at the instant when the instruction code or the access violation code is fetched or requested from the relevant (code) memory unit (=the code-fetch instant). In this connection, the present invention provides the particularly valuable advantage that it can be recognized within the scope of the access violation in which (code) memory unit this access violation has taken place.

For the access violation codes which are specially defined for this purpose and indicate an access violation, and which, likewise as conventional instruction codes, are passed through the fetch or request queue, unused reserved op-codes are defined or modified in accordance with a particularly inventive further embodiment, namely a special op-code for each type of code access violation.

When an access violation occurs in one of the (memory) interface units in the case of a code-fetch, i.e. in the case of fetching or requesting the instruction code, it is not the expected (memory) op-code but the relevant access violation (op-)code of the (memory) interface unit that is entered into the fetch or request queue. The corresponding fetch or request sequence content now carries the data and information about the addresses, particularly the code addresses, and/or the type and/or the location and/or the source and/or the instant of the access violation.

In a further preferred embodiment of the present invention, the circuit arrangement and the method performed with the circuit arrangement are implemented in such a way that, only when the relevant access violation (op-)code reaches the decoding unit and is to be executed, the decoding unit recognizes that a code access violation has taken place at this location in the instruction sequence. In this case, at least a corresponding exception is triggered and/or at least a corresponding flag is set.

In a suitable embodiment of the present invention, at least a source register, particularly a break point-source register comprises several of such flags which can be set in a preferable way by the decoding unit when the decoding unit reaches one or more access violation (op-)codes. In other words, this means that this source register serves for recognizing and/or identifying and/or recording the break source or the origin of the violation when this exception is realized, i.e. when an exception routine is provided.

In accordance with an advantageous further embodiment of the present invention, the access violation (op-)code itself is also cleared or erased when clearing the request unit or when erasing the fetch or request queue, which is done in the meantime, i.e. before running the access violation code. Due to this disappearance of the access violation (op-)code from the fetch or request queue, taking place between the code-fetch and the code-run, no exception is triggered and/or no flag is set. In other words, this means that the fetch or request queue mechanism only responds to certain illegal fetch or request processes which are also actually decoded and executed.

In summary, it can be concluded that the circuit arrangement and the method provide the possibility of an exact diagnosis of one or more (memory) access violations by means of the exception routine of the operating system in relation to the instruction causing the violation and in relation to the source causing the violation (=break source).

This is particularly important in systems imposing strict reliability requirements, in which the operating system performs strong control and reliability functions mostly implemented in the (memory) interface units via the application code used in the system, i.e. it checks whether one or more (memory) access violations have occurred. In this case, the actual code address of the instruction, leading to the disturbance, can be stored at the instant of executing the illegal code by means of the processor unit. As a result, the operating system is caused to ran an error message and/or eliminate the disturbance as well as, even more importantly, its cause.

These and other aspects of the invention are apparent from and will be elucidated with reference to the embodiments described hereinafter.

DETAILED DESCRIPTION OF THE INVENTION

Figure 1:
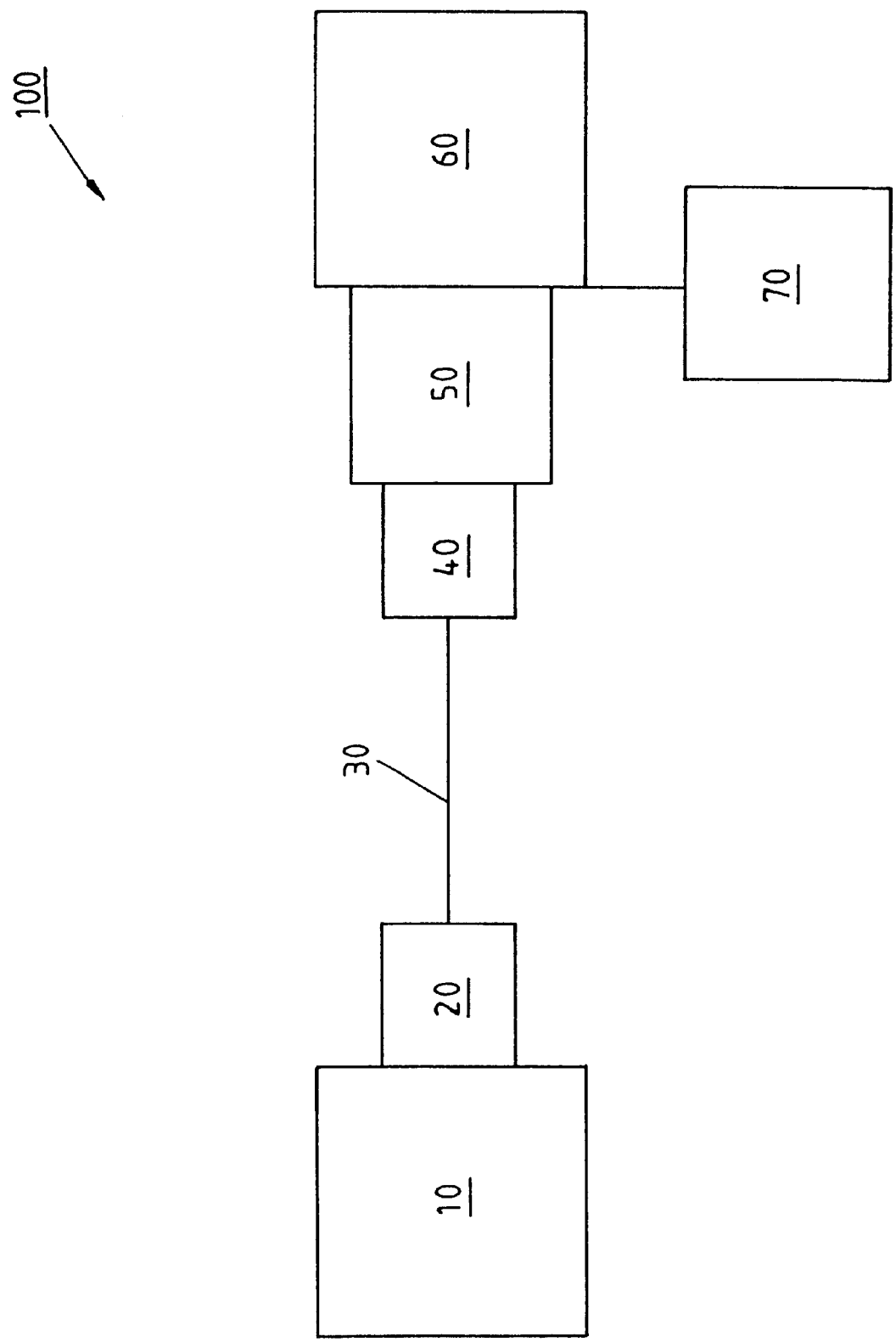
FIG. 1 is a principal circuit diagram of an embodiment of a circuit arrangement according to the present invention.

The electronic circuit arrangement 100, shown in FIG. 1, to be implemented and integrated in a chip card or smart card is used for detecting and/or identifying and/or recording at least an access violation, particularly at least a memory access violation.

To this end, the circuit arrangement 100 comprises a memory unit 10 which is provided with an interface unit 20. By means of a connection 30, the memory unit 10 is connected via the interface unit 20 to a processor unit 60 for executing instruction codes. These instruction codes can be requested via a request unit 40 from the interface unit 20 and are run up in a fetch or request queue in the request unit 40. For running the fetch or request queue, these instruction codes are decodable by means of a decoding unit 50 assigned to the processor unit 60.

A particular detail of the circuit arrangement 100 as well as of the method in which the circuit arrangement 100 is used is that each given category of access violation is assignable to a given category of access violation codes. This access violation code replaces the corresponding instruction code and comprises data such as information on the address, particularly the code address, and/or the type and/or the location and/or the source and/or the instant of the access violation.

In the circuit arrangement 100 in accordance with the embodiment shown in FIG. 1, the request for the instruction code and the execution of the instruction code take place temporally independent of each other. Consequently, the access violation is not indicated when the instruction code is requested but is indicated when it is executed. In the individual case, this may also mean that the access violation code is also erased in the desired manner when the fetch or request queue is erased before running the access violation code.

The temporal separation between requesting the instruction code and executing the instruction code also implies that the access violation is detected and/or identified and/or recorded at the instant of executing the access violation code. Only when the access violation code is executed, an exception routine is generated and a flag is set by the decoding unit 50.

In this respect, the exception routine and the flag are made available by a source register 70 assigned to the decoding unit 50, by which the address, particularly the code address, the type, the location, the source and the instant of the access violation can be identified.

LIST OF REFERENCE NUMERALS

100 circuit arrangement
10 memory unit
20 interface unit
30 connection between memory unit 10 and processor unit 60
40 request unit
50 decoding unit
60 processor unit
70 source register

What is claimed is:

1. An electric or electronic circuit arrangement for detecting and/or identifying and/or recording at least a memory access violation in a microcontroller, the circuit arrangement comprising:

at least a memory unit;

at least an interface unit assigned to the memory unit;

at least a processor unit connected to the memory unit via the interface unit for executing instruction codes, at least a request unit for requesting instructions codes from the interface unit and running up the instruction codes in at least a fetch or request queue in the request unit, at least a decoding unit assigned to the processor unit for decoding the instruction codes and running the fetch or request queue, the decoding unit also being configured to decode access violation codes assigned to each given category of memory access violations for execution by the processor unit, and wherein if the interface unit detects that a request for a particular instruction code causes a memory access violation, the interface unit replaces the particular instruction code with a corresponding access violation code for decoding by the decoding unit and execution by the processor unit, the access violation code including the memory address of the particular instruction code causing the memory access violation.

2. A circuit arrangement as claimed in claim 1, wherein the request for the instruction code and the execution of the instruction code are temporally independent of each other such that the memory access violation is not processed when the instruction code is requested but is processed when the access violation code that replaces the instruction code is executed.

3. A circuit arrangement as claimed in claim 1, wherein the access violation code is also erasable when the fetch or request queue is erased before running the access violation code.

4. A circuit arrangement as claimed claim 1, wherein the memory access violation is detectable and/or identifiable and/or recordable in the processor unit at the instant of executing the access violation code.

5. A circuit arrangement as claimed claim 1, wherein at least an exception routine can be generated and/or at least a flag can be set by the decoding unit when the access violation code is being executed.

6. A circuit arrangement as claimed in claim 5, wherein the exception routine and/or the flag can be made available by at least a source register.

7. A circuit arrangement as claimed in claim 6, wherein the source register is assigned to the decoding unit.

8. A circuit arrangement as claimed in claim 6, wherein the memory address of the particular instruction code causing the memory access violation is identifiable by means of the source register.

9. A circuit arrangement as claimed in any one of claim 1, wherein the access violation code further includes an ID association with the memory unit that stores the particular instruction code that caused the memory access violation.

10. A method of detecting and/or identifying and/or recording at least a memory access violation in a microcontroller, the method comprising the steps of:
 (a) requesting instruction codes from an interface unit assigned to at least a memory unit by means of at least a request unit;
 (b) running up the instruction code in at least a fetch or request queue in the request unit;
 (c) running the fetch or request queue by decoding the instruction code by means of at least a decoding unit assigned to at least a processor unit;
 (d) executing the instruction code by means of the processor unit connected to the memory unit via the interface unit;
 wherein a given category of access violation codes is assigned to each given category of memory access violations, and
 wherein if a request for a particular instruction code causes a memory access violation, the particular instruction code is replaced by the corresponding access violation code for decoding by the decoding unit and execution by the processor unit, the access violation code including the memory address of the particular instruction code causing the memory access violation.

11. A method as claimed in claim 10, wherein the instruction code is requested and executed temporally independently of each other such that the memory access violation is not processed when the instruction code is requested but is processed when the access violation code that replaces the instruction code is executed.

12. A method as claimed in claim 10, wherein the access violation code is also erased when the fetch or request queue is erased before running the access violation code.

13. A method as claimed in claim 10, wherein the memory access violation is detected and/or identified and/or recorded in the processor unit at the instant of executing the access violation code.

14. A method as claimed claim 10, wherein at least an exception routine is generated and/or at least a flag is set by the decoding unit when the access violation code is being executed.

15. A method as claimed in claim 14, wherein the exception routine and/or the flag is made available by at least a source register which is particularly assignable to the decoding unit.

16. A method as claimed in claim 15, wherein the address of the particular instruction code causing the memory access violation is identified by the source register.

17. A method as claimed claim 10, wherein the access violation code further includes an ID association with the memory unit that stores the particular instruction code that caused the memory access violation.

* * * * *